United States Patent
Kihnke

(10) Patent No.: US 8,927,037 B2
(45) Date of Patent: Jan. 6, 2015

(54) DISPOSABLE CARTRIDGE FOR BREWED BEVERAGES

(76) Inventor: Kevin B. Kihnke, Spring Lake, MI (US)

( * ) Notice: Subject to any disclaimer, the term of this patent is extended or adjusted under 35 U.S.C. 154(b) by 544 days.

(21) Appl. No.: 13/313,257

(22) Filed: Dec. 7, 2011

(65) Prior Publication Data
US 2012/0201932 A1    Aug. 9, 2012

Related U.S. Application Data

(60) Provisional application No. 61/440,604, filed on Feb. 8, 2011.

(51) Int. Cl.
| | |
|---|---|
| *B65B 29/02* | (2006.01) |
| *B67D 3/00* | (2006.01) |
| *B65D 85/804* | (2006.01) |
| *A47J 31/06* | (2006.01) |
| *B67D 1/08* | (2006.01) |

(52) U.S. Cl.
CPC .......... *B67D 3/0067* (2013.01); *B65D 85/8043* (2013.01); *A47J 31/0673* (2013.01); *B67D 2001/0827* (2013.01)
USPC ............................... 426/77; 426/115; 99/295

(58) Field of Classification Search
CPC .............. B65D 85/8043; B67D 2/0067; A47J 31/0674
USPC ...................... 426/77, 115; 99/295
See application file for complete search history.

(56) References Cited

U.S. PATENT DOCUMENTS

| | | |
|---|---|---|
| 2,743,664 A | 5/1956 | Dale |
| 3,007,392 A | 11/1961 | Pecararo et al. |
| 3,615,708 A | 10/1971 | Abile-Gal |
| 4,136,202 A | 1/1979 | Favre |
| 4,581,239 A | 4/1986 | Woolman et al. |
| 4,644,855 A | 2/1987 | Woolman et al. |
| 4,738,378 A | 4/1988 | Oakley et al. |

(Continued)

FOREIGN PATENT DOCUMENTS

| | | |
|---|---|---|
| EP | 0870457 A1 | 10/1998 |
| WO | 9402059 A1 | 2/1994 |

(Continued)

OTHER PUBLICATIONS

Excerpt of Ekobrew website located at http://ekobrew.com/index.php, published on or before Nov. 4, 2011; Copyright 2011.

*Primary Examiner* — Rena L Dye
*Assistant Examiner* — Chaim Smith
(74) *Attorney, Agent, or Firm* — Gardner, Linn, Burkhart & Flory, LLP

(57) ABSTRACT

A beverage cartridge includes a bottom wall and at least one sidewall forming a chamber in which a beverage can be prepared from a stored beverage product. The sidewall includes one or more pre-formed openings or openable portions. Openable portions may be scored lines or reduced-thickness lines or regions, which open to form exit paths for a prepared beverage when a compressive force is applied to the sidewall, such as by moving a portion of the bottom wall toward an upper end portion of the cartridge to deform the sidewall and open the openable portions. Where the sidewall instead includes pre-formed openings, these may be initially covered or sealed and provide existing exit paths for prepared beverage upon removal of the cover. Optionally, a filter element is provided inside the cartridge for retaining a used beverage product inside the cartridge as a prepared beverage exits from the cartridge.

23 Claims, 4 Drawing Sheets

(56) References Cited

U.S. PATENT DOCUMENTS

| | | | |
|---|---|---|---|
| 4,846,052 A | 7/1989 | Favre et al. |
| 5,197,374 A | 3/1993 | Fond |
| 5,242,702 A | 9/1993 | Fond |
| 5,272,960 A | 12/1993 | Kinna |
| 5,325,765 A | 7/1994 | Sylvan et al. |
| 5,398,596 A | 3/1995 | Fond |
| 5,472,719 A | 12/1995 | Favre |
| 5,649,472 A | 7/1997 | Fond et al. |
| 5,773,067 A | 6/1998 | Freychet et al. |
| 5,794,519 A | 8/1998 | Fischer |
| 5,840,189 A | 11/1998 | Sylvan et al. |
| D408,679 S | 4/1999 | Potts et al. |
| 5,897,899 A | 4/1999 | Fond |
| 5,913,962 A | 6/1999 | Gasser et al. |
| 5,948,455 A | 9/1999 | Schaeffer et al. |
| 6,009,792 A | 1/2000 | Kraan |
| 6,047,630 A | 4/2000 | Brown et al. |
| 6,050,175 A | 4/2000 | Mirand et al. |
| 6,079,315 A | 6/2000 | Beaulieu et al. |
| 6,082,247 A | 7/2000 | Beaulieu |
| 6,142,063 A | 11/2000 | Beaulieu et al. |
| 6,182,554 B1 | 2/2001 | Beaulieu et al. |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan et al. |
| 6,490,966 B2 | 12/2002 | Mariller et al. |
| D474,110 S | 5/2003 | Sweeney |
| D474,111 S | 5/2003 | Lazaris |
| 6,584,888 B2 | 7/2003 | Cortese |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,698,332 B2 | 3/2004 | Kollep et al. |
| 6,708,600 B2 | 3/2004 | Winkler et al. |
| 6,725,762 B2 | 4/2004 | Kollep et al. |
| D489,215 S | 5/2004 | Honan et al. |
| 6,748,850 B1 | 6/2004 | Kraan |
| 6,759,072 B1 | 7/2004 | Gutwein et al. |
| 6,763,759 B2 | 7/2004 | Denisart |
| 6,799,503 B2 | 10/2004 | Kollep et al. |
| 6,832,542 B2 | 12/2004 | Hu et al. |
| 6,844,015 B2 | 1/2005 | Yuguchi |
| 6,857,352 B2 | 2/2005 | Fischer |
| 6,857,353 B2 | 2/2005 | Kollep et al. |
| D502,362 S | 3/2005 | Lazaris et al. |
| 6,904,840 B1 | 6/2005 | Pfeifer et al. |
| 6,926,170 B2 | 8/2005 | Groesbeck |
| D513,572 S | 1/2006 | Schaffeld et al. |
| 7,081,263 B2 | 7/2006 | Albrecht |
| 7,165,488 B2 | 1/2007 | Bragg et al. |
| D542,088 S | 5/2007 | Albrecht |
| D544,299 S | 6/2007 | Schaffeld et al. |
| 7,258,061 B2 | 8/2007 | Campbell et al. |
| 7,258,884 B2 | 8/2007 | Albrecht |
| D560,430 S | 1/2008 | Albrecht |
| 7,318,372 B2 | 1/2008 | Cooke |
| 7,347,138 B2 | 3/2008 | Bragg et al. |
| 7,360,418 B2 | 4/2008 | Pelovitz |
| 7,367,472 B2 | 5/2008 | Simson et al. |
| 7,377,162 B2 | 5/2008 | Lazaris |
| 7,398,726 B2 | 7/2008 | Streeter et al. |
| 7,412,921 B2 | 8/2008 | Hu et al. |
| 7,438,941 B2 | 10/2008 | Gutwein et al. |
| 7,455,867 B1 | 11/2008 | Gutwein et al. |
| 7,513,192 B2 | 4/2009 | Sullivan et al. |
| 7,523,695 B2 | 4/2009 | Streeter et al. |
| 7,552,673 B2 | 6/2009 | Levin |
| 7,591,218 B2 | 9/2009 | Bunn et al. |
| D606,363 S | 12/2009 | Aardenburg |
| 7,640,842 B2 | 1/2010 | Bardazzi |
| 7,640,845 B2 | 1/2010 | Woodnorth et al. |
| 7,770,512 B2 | 8/2010 | Albrecht |
| 2002/0002913 A1 | 1/2002 | Mariller et al. |
| 2002/0124736 A1 | 9/2002 | Kollep et al. |
| 2004/0031394 A1 | 2/2004 | Yoakim et al. |
| 2004/0045443 A1 | 3/2004 | Lazaris et al. |
| 2004/0182248 A1 | 9/2004 | Fischer |
| 2005/0051478 A1 | 3/2005 | Karanikos et al. |
| 2005/0106288 A1 | 5/2005 | Blanc et al. |
| 2005/0132891 A1 | 6/2005 | Chen et al. |
| 2005/0205601 A1 | 9/2005 | Taylor |
| 2005/0235834 A1 | 10/2005 | Blanc et al. |
| 2005/0287251 A1 | 12/2005 | Lazaris et al. |
| 2006/0174773 A1 | 8/2006 | Taylor |
| 2006/0292012 A1 | 12/2006 | Brudevold et al. |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2010/0024658 A1 | 2/2010 | Jacobs et al. |
| 2010/0086650 A1 | 4/2010 | Levin |
| 2010/0260896 A1 | 10/2010 | Yoakim et al. |
| 2010/0303964 A1 | 12/2010 | Beaulieu et al. |
| 2011/0073607 A1 | 3/2011 | Fu et al. |
| 2011/0303095 A1 | 12/2011 | Fu et al. |
| 2012/0058226 A1 | 3/2012 | Winkler et al. |

FOREIGN PATENT DOCUMENTS

| | | |
|---|---|---|
| WO | 9820782 A1 | 5/1998 |
| WO | 0130218 A1 | 5/2001 |
| WO | 02081327 | 10/2002 |
| WO | 2005066040 | 7/2005 |

DISPOSABLE CARTRIDGE FOR BREWED BEVERAGES

CROSS REFERENCE TO RELATED APPLICATION

The present application claims the priority benefit of U.S. provisional application Ser. No. 61/440,604, filed Feb. 8, 2011, which is hereby incorporated herein by reference in its entirety.

FIELD OF THE INVENTION

The present invention relates generally to cup-like containers for storing dry or concentrated beverage product, and dispensing a prepared beverage by injecting water or other fluid into the cartridge.

BACKGROUND OF THE INVENTION

Single-use beverage cups or cartridges typically contain a dry beverage product such as coffee grounds, tea leaves, or a dry beverage concentrate (e.g. freeze-dried coffee crystals) or the like, such as for use in single-serving beverage brewing machines. Depending on the type of beverage product the cartridge contains, the cartridge may include a filter to prevent particles of beverage product from exiting the cartridge during a beverage-making operation. Such beverage cartridges are typically pierced in one or more locations to inject water and to drain a resulting prepared beverage out of the cartridge and into a receptacle.

SUMMARY OF THE INVENTION

The present invention provides a beverage cartridge having a bottom wall and a generally cylindrical sidewall, the sidewall having at least one openable portion that opens to form an exit path for a prepared beverage. The cartridge sidewall may be opened by applying a compressive load to the sidewall, such as by moving a portion of the cup bottom wall toward an upper end portion of the sidewall. The openable portions of the sidewall may be, for example, apertures, slits, or slots that extend entirely through the sidewall, or they may be weakened portions of the sidewall that maintain the cartridge in a substantially sealed condition until compressive loads are applied to split open the weakened portions. The beverage cartridge may allow for increased capacity of beverage product because substantially all of the interior space of the cartridge is available for the beverage, regardless of whether an optional filter element is included. Further, a used cartridge may be significantly deformed and thus very noticeably different in appearance after use, as compared to an unused cartridge, making it easy for a user to determine at a glance (or even by touch) whether the cartridge is used or unused.

According to one form of the present invention, a beverage cartridge includes a cup bottom wall, at least one cup sidewall having an opening, and a filter element. The cup sidewall extends upwardly from the cup bottom wall and has an upper end portion opposite the cup bottom wall. The cup bottom wall and the cup sidewall cooperate to form a chamber. The opening or openings in the cup sidewall provide one or more exit paths for a liquid beverage. The filter element is disposed in the chamber and filters liquid beverage that is dispensed through the one or more openings in the cup sidewall. Optionally, a removable cover is provided along the cup sidewall to cover and/or seal the openings in the cup sidewall.

According to another form of the present invention, a beverage cartridge includes a cup bottom wall and at least one cup sidewall cooperating to form a chamber. The sidewall extends upwardly from the bottom wall and has an upper end portion opposite the bottom wall, the sidewall including at least one openable portion. The cup sidewall is configured to open at the openable portion to form an exit path for the contents of the chamber through the cup sidewall. The openable portion may be opened to form the exit path by applying a compressive load to the sidewall, such as by moving a portion of the cup bottom wall toward the upper end portion of the sidewall, which may crush or buckle the sidewall. Optionally, the cup bottom wall is made from a puncture and fracture-resistant material. Optionally, the openable portion of the cup sidewall is openable in response to increased fluid pressure in said chamber. This fluid pressure may also help force liquid beverage out through the openable portion of the cup sidewall.

In one aspect, the cartridge includes a filter element positioned inside the chamber defined by the cup bottom wall and the cup sidewall. The filter element includes a filter bottom wall and a filter sidewall to form a filter chamber for containing a beverage product. Optionally, the filter walls closely conform to inner surfaces of the cup bottom wall and the cup sidewall. An upper end portion of the filter sidewall may be sealed to the upper end portion of the cup sidewall to prevent beverage product particles from escaping the filter chamber.

In another aspect, the beverage cartridge includes a top lid that is sealed to the upper end portion of the cup sidewall, to seal the chamber from the outside environment. Optionally, the top lid is a pierceable membrane, such as a multi-layer or laminate membrane including at least one metal foil layer and at least one plastic film layer, such as a polyethylene layer.

In still another aspect, the openable portion of the cup sidewall is an aperture that extends completely through the sidewall. For example, the aperture could be a slit or a slot, or a hole extending through the cup sidewall to expose the chamber. Optionally, the cartridge includes a removable cover around or along an outer surface of the sidewall for covering the aperture(s) that form the openable portion or portions of the cup sidewall.

In yet another aspect, the openable portion of the cup sidewall is a weakened portion of the cup sidewall so that the cartridge chamber can remain sealed from the outside environment until the weakened portion is opened. Optionally, the weakened portion is a score line in the cup sidewall, which does not extend entirely through the sidewall. Optionally, the weakened portion is a reduced-thickness region of the cup sidewall.

In yet another aspect, the beverage cartridge includes a beverage product in the chamber. For example, the beverage product may be a brewed or non-dissolving beverage product contained in a filter chamber.

According to another form of the present invention, a method is provided for preparing a beverage from a beverage product contained in a cartridge. The method includes providing a beverage cartridge including an outer cup that defines a chamber for containing the beverage product. The outer cup has a cup bottom wall, at least one cup sidewall extending upwardly from the bottom wall, at least one openable portion in the cup sidewall; and a pierceable top lid that is sealed to an upper end portion of the cup sidewall, opposite the bottom wall. The method further includes applying a compressive force to urge the cup bottom wall toward the upper end portion of the cup sidewall, or vice versa, thereby forming an opening in the cup sidewall at the openable portion. A fluid is injected through the top lid and into the chamber, where the fluid mixes with the beverage product to form the beverage. The beverage is dispensed from the chamber through the opening in the cup sidewall. Optionally, the opening in the cup sidewall is created via application of fluid pressure to the cup chamber, which fluid pressure may also aid the beverage product in being discharged through the opening in the cup sidewall.

In one aspect, the method further includes providing a filter element disposed in the chamber of the outer cup, the filter element for containing the beverage product. The beverage is filtered through the filter element just before the beverage is dispensed through the opening in the cup sidewall, and the beverage product itself is retained in the filter element.

In another aspect, the step of applying the compressive force includes supporting the upper end portion of the cup sidewall and pressing upwardly on the cup bottom wall to cause at least a portion of the cup sidewall to buckle in the vicinity of the openable portion.

In a further aspect, the step of forming an opening in the cup sidewall at the openable portion includes splitting open a weakened portion of the cup sidewall.

Thus, the present invention provides a beverage cartridge that contains a beverage product in a substantially sealed chamber prior to the addition of fluid and the extraction or dispensing of a prepared beverage from the cartridge. The sidewall of the cartridge includes one or more openable portions that open in response to the application of compressive loads to the sidewall, which may cause at least limited crushing, buckling, or similar deformations to the sidewall. The cartridge can be adapted for use with brewed beverage product that is contained in a filter inside the cartridge, or the cartridge may contain dry or concentrated and dissolvable beverage product that simply mixes with or dissolves in water or similar fluid to create a finished beverage without need for filtration. Although the cartridge may typically be used in single-serving beverage applications, it will be appreciated that the cartridge may be scaled in size to provide substantially any desired number of servings. Its space-efficient design also allows for increased capacity, particularly for brewed beverages utilizing a filter, to allow an increased quantity of beverage to be prepared from a relatively small package. Further, because the cartridge typically undergoes extensive permanent deformation and opening of fluid exit paths in the sidewall during the beverage-making process, a user can readily observe whether a given cartridge is used or unused.

These and other objects, advantages, purposes, and features of the present invention will become apparent upon review of the following specification in conjunction with the drawings.

DESCRIPTION OF THE PREFERRED EMBODIMENTS

Figure 1:
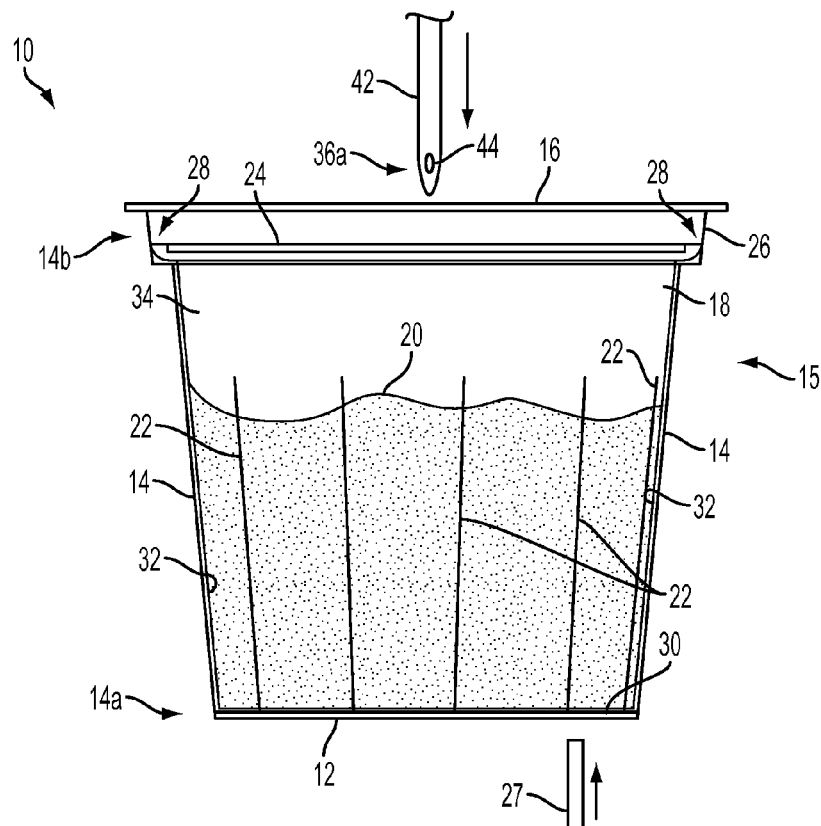
FIG. 1 is a side elevation of a beverage cartridge in accordance with the present invention, including a diagrammatic depiction of an initial step in preparing a beverage with the cartridge.
Figure 2:
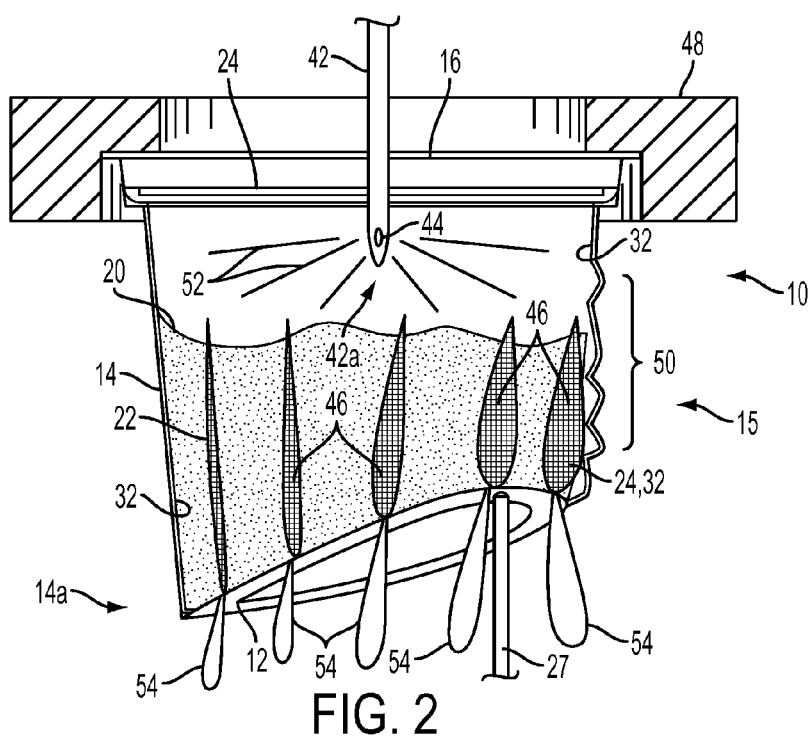
FIG. 2 is a side elevation of the beverage cartridge of FIG. 1, in which the cartridge has been partially crushed to create openings in the cartridge sidewall.

The present invention is directed to a beverage cartridge for storing and dispensing a beverage product and a method of making a prepared beverage inside the cartridge, the prepared beverage being dispensed from the cartridge and into a beverage receptacle. Referring to FIG. 1, a beverage cartridge 10 includes a bottom wall 12, a generally cylindrical or frusto-conical upstanding sidewall 14 extending upwardly from bottom wall 12, and a top lid or cover 16. It will be appreciated that the terms "upper" and "lower" are used throughout this specification with reference to the appended drawings, and are not intended to be limiting in any way. Bottom wall 12 and sidewall 14 cooperate to form a cup-shaped container 15 that, when sealed with top lid 16, defines a sealed chamber 18 for storing a beverage product 20. Sidewall 14 defines a plurality of openable portions 22 that, in the illustrated embodiment of FIGS. 1 and 2, are scored or reduced-thickness lines or regions in the sidewall, but which instead could be through-holes or slits or openings that extend completely through the sidewall.

Sidewall 14 may be a relatively thin flexible wall having a lower end portion 14a joined to a perimeter of bottom wall 12, and having an upper wall portion 14b to which top lid 16 is attached. Openable portions 22 remain closed prior to use of the cartridge in order to maintain beverage product 20 substantially sealed inside of chamber 18 and isolated from the surrounding atmosphere. When openable portions 22 are formed or configured as weakened score lines, these score lines may be created using different methods such as die-cutting, laser-etching, or the like. Optionally, the openable portions 22 may be formed as reduced-thickness lines or regions that are formed during the same process by which sidewall 14 is formed, such as a molding process. In the illustrated embodiment, openable portions 22 extend substantially all the way down to where lower end portion 14a meets bottom wall 12, to maximize the drainage of prepared beverage from chamber 18. Substantially any number of openable portions may be used, although seven or eight openable portions or lines may be typical for single-serving beverage cartridges.

Thus, with openable portions 22 formed as weakened regions of sidewall 14, the openable portions 22 remain substantially sealed during normal handling of the cartridge 10, but are readily opened during a beverage-making process that involves compressing and/or buckling sidewall 14 to induce localized stresses in the sidewall, thus causing at least some of the openable portions 22 to open (FIG. 2), as will be described in more detail below. Optionally, the openable portions 22 may open in response to an increase in fluid pressure in chamber 18. Regardless of the manner in which openable portions 22 are opened, it will be appreciated that any fluid pressure inside of chamber 18, which exceeds atmospheric pressure, will tend to urge the beverage product out through the openings formed by openable portions 22. Thus, discharge of the beverage product may be accomplished through gravity flow and/or flow aided by fluid pressure in the chamber.

Figure 5:
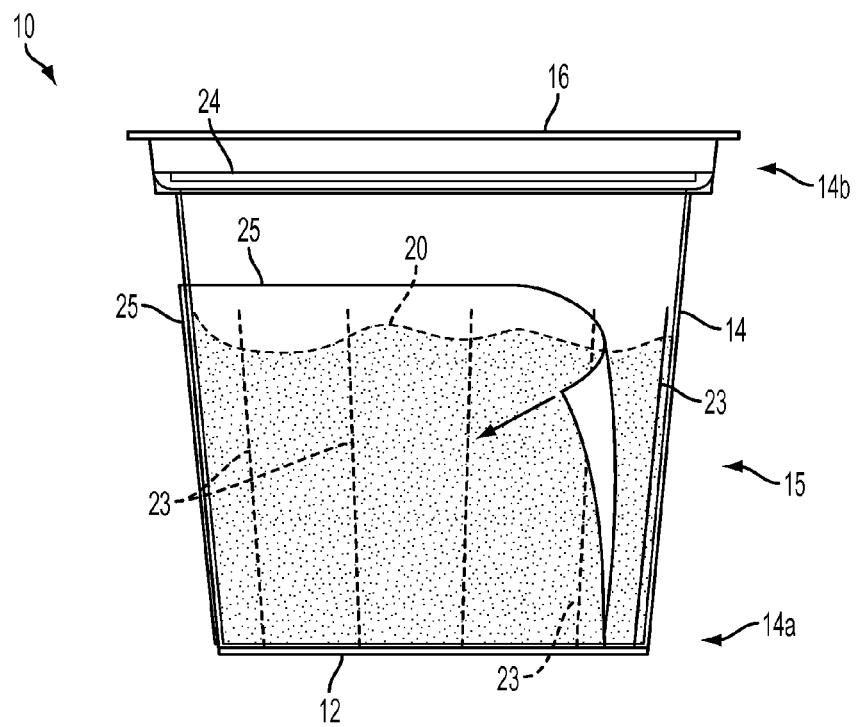
FIG. 5 is a side elevation of another beverage cartridge, including a removable cover along the sidewall for covering pre-formed apertures in the sidewall.
Figure 6:
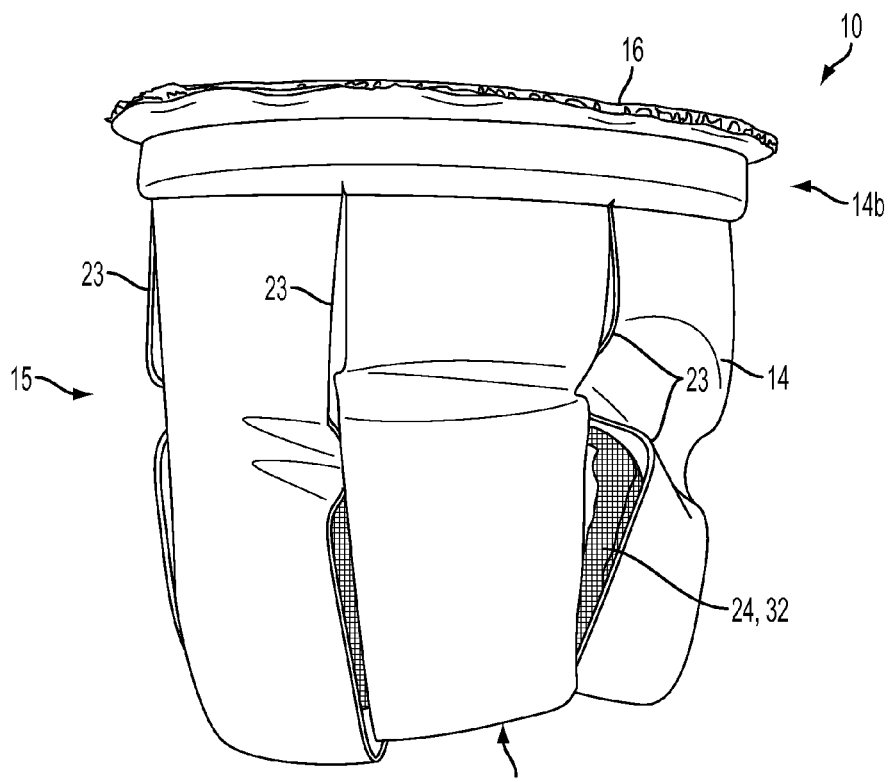
FIG. 6 is a side perspective view of a cartridge similar to that of FIG. 5, but after crushing, and having a plurality of opened slits in its crushed sidewall.

Optionally, openable portions 22 are made up of apertures 23, such as slits, slots, cuts, or the like, which extend all the way through sidewall 14 (FIG. 6). A removable outer cover 25 (FIG. 5) may be provided around at least the portions of sidewall 14 having apertures 23. The outer cover 25 may be self-adhering and self-sealing along an outer surface of sidewall 14 to limit or prevent the exposure of beverage product 20 in chamber 18 to the outside atmosphere through apertures 23. For example, outer cover 25 may be a foil and/or polymeric film layer attached or sealed directly to sidewall 14 via a light adhesive or sealant layer. Removable cover 25 substantially prevents oxygen and other gases and/or contaminants from entering or escaping from chamber 18 through apertures 23, and may prevent the escape of beverage product 20 from apertures 25, prior to the initiation of a beverage-preparation process. Prior to beverage preparation, a user can peel away the removable cover 25 to expose the apertures 23, such as shown in FIG. 6.

Bottom wall 12 of cup portion 15 may be strengthened or reinforced, particularly as compared to sidewall 14, to resist fracturing or puncturing during the application of mechanical loads by a compression member such as a pin or finger 27 (FIG. 2), or even a movable disc, that can be moved upwardly. For example, bottom wall 12 and sidewall 14 may be unitarily formed in a molding process, with bottom wall 12 made substantially thicker than sidewall 14 to provide added strength. Optionally, bottom wall 12 may incorporate reinforcing fibers, an extra layer or coating of reinforcing material, or the like, to provide sufficient strength to bottom wall 12.

Figure 3:
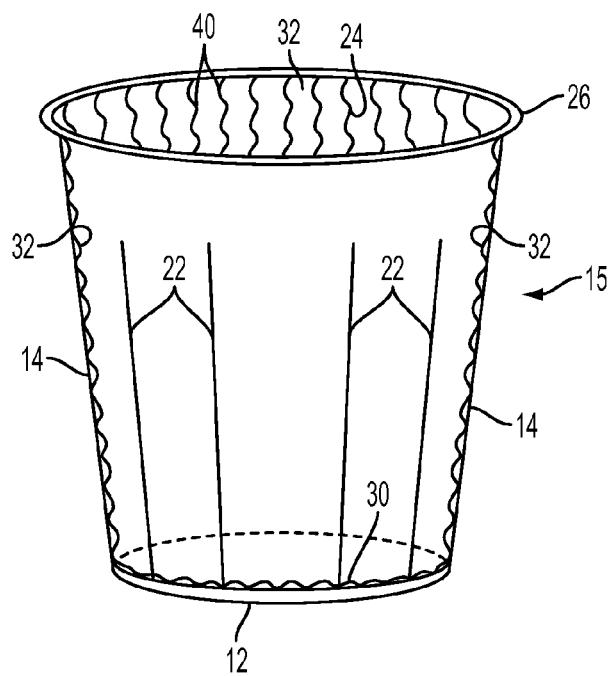
FIG. 3 is a side perspective view of the cup portion and filter element of the beverage cartridge of FIG. 1.
Figure 4:
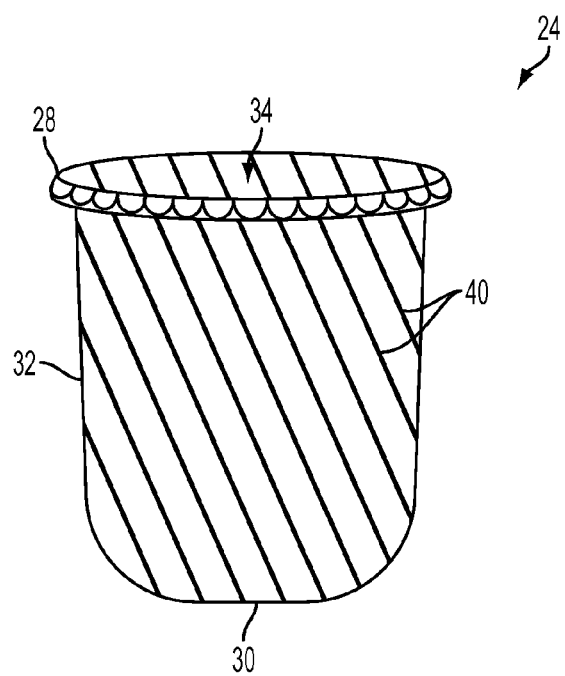
FIG. 4 is a side perspective view of a filter element.

Optionally, and as shown in FIGS. 1-4, beverage cartridge 10 can be fitted with a filter member or element 24 that lines the interior surfaces of sidewall 14 and bottom wall 12. Upper end portion 14b of sidewall 14 forms an increased-diameter ledge or shoulder region 26 that receives an upper rolled or flared lip region 28 of filter member 24. As best seen in FIGS. 3 and 4, filter member 24 includes a filter bottom wall 30 and a filter sidewall 32, which generally correspond to the cup portion's bottom wall 12 and sidewall 14, respectively. Flared lip 28 is formed at the upper end of filter sidewall 32, and may be sealed to shoulder region 26 of sidewall 14 using a food-safe adhesive or sealant, to limit or prevent beverage product 20 from escaping filter member 24. As best seen in FIGS. 1 and 2, filter bottom wall 30 substantially lines bottom wall 12, and filter sidewall 32 substantially lines sidewall 14 such that filter sidewall 32 extends substantially the full length of the interior of the cup sidewall 14 all the way to bottom wall 12, so that there is little or no space between filter member 24 and the inner side or bottom surfaces of cup portion 15. This maximizes the available space in beverage cartridge 10 for beverage product 20. Thus, filter member 24 defines a filter chamber 34 inside of chamber 18, which has nearly the same volume or capacity as chamber 18.

It will be appreciated that when beverage product 20 is a non-dissolving beverage product such as ground coffee, tea leaves, or the like, filter member 24 provides filtration for liquids injected into cartridge 10, so that the beverage product solids are retained inside of filter chamber 34 during the beverage preparation or brewing process. Filter member 24 may be made from substantially any filter material, such as paper-based filter material that is commonly used for conventional disposable coffee filters and the like. Optionally, a metallic or polymeric screen or mesh material may be used to form the filter member, without departing from the spirit and scope of the present invention. Filter member 24 includes a plurality of fold lines or pleats or flutes 40 in its sidewall 32, which increase the filtration surface area of filter member 24 (FIGS. 3 and 4). Optionally, and instead of the generally slanted or spiral-shaped flutes 40 of FIG. 4, the filter member may be formed with generally vertically-aligned flutes or pleats, or with no pleats at all (such as to maximize the space available for beverage product within the filter).

Top lid 16 is sealed at its outer perimeter region to the generally circular upper end portion 14b of sidewall 14. In the illustrated embodiment, top lid 16 is a pierceable sheet member that is applied after chamber 18 is filled with beverage product 20 and/or filter member 24. For example, top lid 16 may be a thin laminate membrane made up of at least one metal foil layer (such as aluminum) and optionally a polymeric film, such as a polyethylene layer, to enhance the strength of the top lid and/or to enhance its hermetic sealing properties. Top lid 16 may be readily pierced by a fluid injection needle 42 or other fluid conduit, such as shown in FIGS. 1 and 2. Preferably, needle 42 is hollow and has an opening 44 through which fluid conducted along the interior conduit of the needle may exit.

To prepare and extract a beverage from beverage cartridge 10, at least one of the lower and upper end portions 14a, 14b of sidewall 14 is pushed toward the other to impart localized stresses in the sidewall 14 near at least some of openable portions 22. These stresses cause openable portions 22 to split or otherwise spread open, thus forming one or more openings 46 (FIG. 2) that create exit paths for the liquid contents of chamber 18. Beverage cartridge 10 may be installed in a machine that includes an annular top support 48 that engages at least an outer perimeter region of top lid 16 along upper end portion 14b of sidewall 14 (FIG. 2). The machine may further include injection needle 42 and compression finger, projection, or disc 27, which move in opposite directions relative to one another, and to beverage cartridge 10 and top support 48, during the beverage preparation process (FIGS. 1 and 2).

Once beverage cartridge 10 is installed in the machine and top support 48 is positioned as shown in FIG. 2, injection needle 42 may be moved downwardly and through top lid 16 so that at least a tip portion 42a of the injection needle 42 is positioned inside of chamber 18. Compression member or finger 27 is moved upwardly to engage and urge bottom wall 12 upwardly (FIG. 2), which imparts stresses in sidewall 14 to create openings 46 at openable portions 22. This may cause sidewall 14 to buckle or otherwise deform, such as shown at reference numeral 50 in FIG. 2. It will be appreciated that compression member or finger 27 may be moved to push bottom wall 12 upwardly relative to upper end portion 14b of sidewall 14 either before or after the downward piercing motion of injection needle 42. Optionally, the motion of both injection needle 42 and compression member or finger 27 may be accomplished simultaneously. Once injection needle 42 pierces top lid 16 with its tip portion 42a disposed in chamber 18; a fluid 52 such as hot or cold water or a water-based mixture, is dispensed into chamber 18 via opening 44 in hollow needle 42 to mix with beverage product 20.

Alternatively, openable portions 22 may be opened by a buildup of fluid pressure inside of chamber 18 due to injection of fluid 52 through needle 42a, such that sidewalls 14 need not be buckled or compressed under a compressive load to create the openings. In this case, top lid 16 will be configured to substantially seal around injection needle 42 as the tip portion 42a passes through the lid, and top lid 16 will be sufficiently secured to top portion 14b of sidewall 14, so that sufficient fluid pressure may be built up in chamber 18 to cause openable portions 22 to split open under tensile stresses in the sidewall 14, and substantially without fluid leakage through top lid 16. Such buildup of fluid pressure would also facilitate the discharge of beverage through the openable portions, such as to provide more complete discharge of product (and/or to extract more flavor from coffee grounds, tea leaves, or other brewed beverage product), than would otherwise occur if the beverage were discharged out of chamber 18 via gravity only.

In the illustrated embodiment of FIGS. 1 and 2, beverage product 20 is a non-dissolving product, such as coffee grounds or tea leaves, which are contained within filter member 24, of which filter sidewall 32 is visible through openings 46 in sidewall 14 in FIG. 2. As fluid 52 passes through beverage product 20, it forms a finished or prepared beverage 54, which seeps out through filter sidewall 32 and openings 46. Prepared beverage 54 is subsequently collected and directed into a beverage container, such as a mug or carafe. After the beverage preparation process is complete, top support 48 may be raised so that beverage cartridge 10 may be removed from the machine and discarded. It will be appreciated that a dissolvable beverage product, such as dry coffee or tea crystals, flavored beverage powders, or the like, may also be prepared using the beverage cartridge 10 either with or without a filter member, since the dissolvable beverage product would be expected to completely dissolve in the presence of fluid 52 and pass through a filter, if present.

It will be appreciated that the beverage cartridge and/or beverage making process may be varied from the above descriptions, without departing from the spirit and scope of the present invention. For example, the beverage cartridge may include a non-reinforced bottom wall that is urged upwardly by a larger compression element such as a plate or disc sized similarly to that of the bottom wall. Optionally, a larger displacement member may be used to displace all or a portion of the bottom wall of the beverage cartridge during the beverage making process, and it may even be desirable to provide a mechanism that displaces the entire bottom wall of the cartridge toward the upper end portion of the sidewall, so that substantially the entire sidewall is crushed or buckled, thus maximizing the area of the openings around the sidewall, and dispensing beverage substantially evenly through all of the openings, with minimal liquid retained in the cartridge after the beverage is dispensed. Optionally, it will be appreciated that a displacement member could displace the top of the cartridge toward the bottom wall, without departing from the spirit and scope of the present invention.

Figure 7:
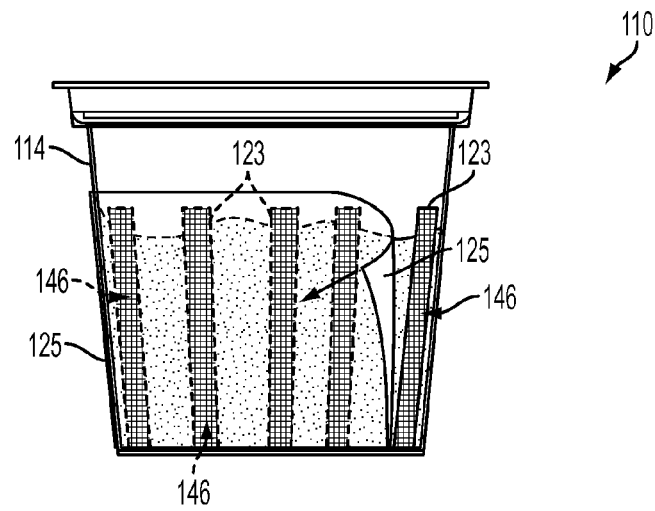
FIG. 7 is a side elevation of another beverage cartridge, including a removable cover along the sidewall for covering pre-formed slot openings in the sidewall.
Figure 8:
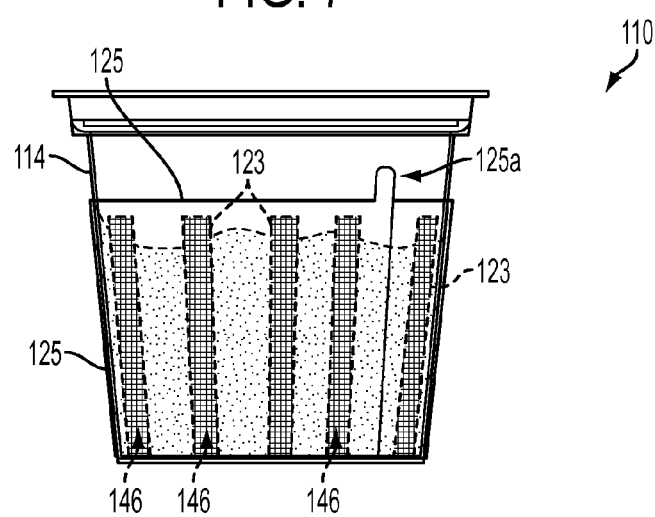
FIG. 8 is a side elevation of a cartridge similar to that of FIG. 7, but with a removable cover having a pull tab.

Optionally, and with reference to FIG. 7, another beverage cartridge 110 is structurally similar to cartridge 10, but includes a plurality of slot-openings 123 around a sidewall 114. Slot-openings 123 define open areas or exit paths 146 in sidewall 114, which are covered by a removable outer cover 125 prior to use of cartridge 110 for making a beverage. Thus, cartridge 110 may be used for preparing a beverage in a similar manner as the method of preparing a beverage using cartridge 10, described above, but optionally without a crushing or compressing step because once outer cover 125 is removed, exit paths 146 are open and exposed for discharging fluids. Removable outer cover 125 may be peeled away from cup sidewall 114 prior to use of cartridge 110, such as by gripping an optional pull-tab 125*a* (FIG. 8) and pulling to unseal cover 125 from sidewall 114 and openings 123.

Figure 9:
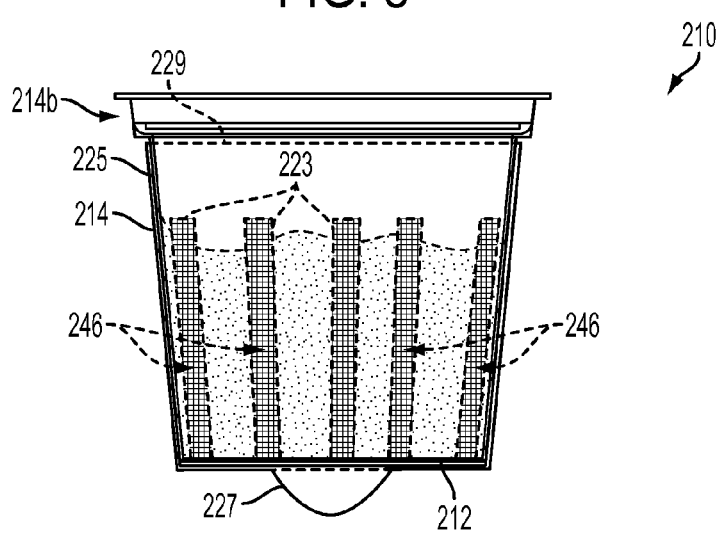
FIG. 9 is a side elevation of another cartridge similar to that of FIG. 7, but with a removable cover having a bottom twist-tab.

Optionally, and with reference to FIG. 9, another beverage cartridge 210 may include a removable outer cover 225 that is sealed around a sidewall 214, above a plurality of slot-openings 223. Outer cover 225 includes one or more twist-off gripping tabs 227 along a bottom wall 212 of cartridge so that a user may grip cartridge near an upper end portion 214*b* of sidewall 214, and grip cover 225 at gripping tab 227, and remove outer cover 225 by twisting gripping tab 227 relative to sidewall 214. The twisting motion may break open cover 225 at a seam or seal 229 near upper end portion 214*b* of sidewall 214, and/or similar seams or seals in the cover 225 along the sidewall 214 or bottom wall 212 of cartridge 210. Removal of cover 225 exposes exit paths 246 through which prepared beverage or fluid may be dispensed, without need for crushing or compressing sidewall 214.

Optionally, one or more beverage cartridges, each having one or more pre-formed holes or openings established in their respective sidewalls, may be overwrapped or collectively overwrapped in a substantially sealed and air-tight wrapper, such as a plastic film or foil or composite wrapper, a vacuum-sealed wrapper, a re-sealable wrapper, or the like. Individually or collectively-wrapped cartridges may include either of the beverage cartridges 110, 210 described above, or may be cartridges that are substantially similar to cartridges 110, 210, but without the individual removable outer covers 125, 225. In this way, one or two or more cartridges may be stored in a single air-tight wrapper, which is removed from the cartridge(s) prior to using the first cartridge, so that the pre-formed holes or openings of the cartridges are exposed to the surrounding air after the wrapping is opened. Optionally, the overwrapping may be a re-usable and re-sealable wrapper that can be used to store any unused cartridges. Although this may expose the beverage products contained in the unused cartridge to air and humidity for some time before a cartridge's use, particularly if the unused cartridge is stored in an unsealed condition, the time or amount of exposure (which may be expected to range from a few minutes to several days) may be relatively limited so that substantially little or no degradation of the beverage product occurs prior to brewing, even though the openings in the cartridge sidewalls have been exposed prior to the brewing process. In this way, cartridges having pre-formed openings for discharging beverage product may optionally be produced with a less costly overwrapping, rather than with individually removable outer covers such as those described above, and without significantly affecting the quality of the brewed beverage.

Thus, the beverage cartridge of the present invention provides a relatively inexpensive, space-efficient, and easy-to-handle device and method for making a prepared beverage, and which may provide an obvious indication (e.g. crushed sidewalls) when the cartridge is used and should be discarded. The cartridge may be fitted with a filter element for retaining ground coffee, tea, or other beverage products within the cartridge chamber during a brewing process.

Changes and modifications in the specifically described embodiments may be carried out without departing from the principles of the present invention, which is intended to be limited only by the scope of the appended claims, as interpreted according to the principles of patent law, including the doctrine of equivalents.

The invention claimed is:

1. A beverage cartridge comprising:
  a cup bottom wall;
  at least one cup sidewall extending upwardly from said cup bottom wall and having an upper end portion opposite said cup bottom wall, said cup bottom wall and said cup sidewall cooperating to form a chamber;
  said cup sidewall having at least one openable portion; and
  a top lid sealed to said upper end portion of said cup sidewall, opposite said cup bottom wall, for sealing said chamber;
  wherein said cup sidewall is configured to open at said openable portion and thereby form an exit path for the contents of said chamber through said cup sidewall when a compressive force is applied to said sidewall by moving at least one of said cup bottom wall and said upper end portion of said sidewall toward the other of said cup bottom wall and said upper end portion of said sidewall.

2. The beverage cartridge of claim 1, further comprising a filter element disposed in said chamber, said filter element comprising:
   a filter bottom wall; and
   a filter sidewall extending upwardly from said filter bottom wall and having an upper end portion opposite said filter bottom wall, said filter bottom wall and said sidewall cooperating to form a filter chamber for containing a beverage product.

3. The beverage cartridge of claim 2, wherein said filter closely conforms to inner surfaces of said cup bottom wall and said cup sidewall, with said filter bottom wall lining said cup bottom wall and said filter sidewall lining said cup sidewall.

4. The beverage cartridge of claim 2, wherein said upper end portion of said filter sidewall is sealed to said upper end portion of said cup sidewall.

5. The beverage cartridge of claim 2, further comprising a brewed beverage product disposed in said filter chamber.

6. The beverage cartridge of claim 1, wherein said cup bottom wall comprises a puncture-resistant material.

7. The beverage cartridge of claim 1, wherein said top lid comprises a pierceable membrane.

8. The beverage cartridge of claim 7, wherein said pierceable membrane comprises a metal foil layer and a polyethylene layer.

9. The beverage cartridge of claim 1, wherein said openable portion of said cup sidewall comprises an aperture extending completely through said sidewall.

10. The beverage cartridge of claim 9, wherein said aperture comprises a slit.

11. The beverage cartridge of claim 9, further comprising a removable cover along said sidewall and covering said aperture.

12. The beverage cartridge of claim 1, wherein said openable portion of said cup sidewall comprises a weakened portion of said cup sidewall.

13. The beverage cartridge of claim 12, wherein said weakened portion comprises a scored line in formed said cup sidewall.

14. The beverage cartridge of claim 12, wherein said weakened portion comprises a reduced-thickness region in said cup sidewall.

15. The beverage cartridge of claim 1, further comprising a beverage product disposed in said chamber.

16. A beverage cartridge comprising:
   a cup bottom wall;
   at least one cup sidewall extending upwardly from said cup bottom wall and having an upper end portion opposite said cup bottom wall, said cup bottom wall and said cup sidewall cooperating to form a chamber;
   said cup sidewall having at least one openable portion; and
   a top lid sealed to said upper end portion of said cup sidewall, opposite said cup bottom wall;
   wherein said cup sidewall is configured to open at said openable portion and thereby form an exit path for the contents of said chamber through said cup sidewall when a stress is imparted to said sidewall by moving said cup bottom wall toward said upper end portion of said sidewall or by moving said upper end portion of said sidewall toward said cup bottom wall.

17. The beverage cartridge of claim 16, wherein said openable portion of said cup sidewall comprises a weakened portion of said cup sidewall, said weakened portion comprising at least one chosen from (i) a scored line in formed said cup sidewall and (ii) a reduced-thickness region in said cup sidewall.

18. The beverage cartridge of claim 16, wherein said openable portion of said cup sidewall comprises an aperture extending completely through said sidewall.

19. A beverage cartridge comprising:
   a cup bottom wall wherein said bottom wall comprises a fracture-resistant or puncture-resistant material;
   at least one cup sidewall extending upwardly from said cup bottom wall and having an upper end portion opposite said cup bottom wall, said cup bottom wall and said cup sidewall cooperating to form a chamber;
   said cup sidewall having at least one openable portion; and
   a top lid sealed to said upper end portion of said cup sidewall, opposite said cup bottom wall, for sealing said chamber;
   wherein said cup sidewall is configured to open at said openable portion and thereby form an exit path for the contents of said chamber through said cup sidewall when a force is applied to said sidewall by at least one chosen from (i) increasing a fluid pressure in said chamber and (ii) moving at least one of said cup bottom wall and said upper end portion of said sidewall toward the other of said cup bottom wall and said upper end portion of said sidewall.

20. The beverage cartridge of claim 19, further comprising a filter element disposed in said chamber, said filter element comprising:
   a filter bottom wall; and
   a filter sidewall extending upwardly from said filter bottom wall and having an upper end portion opposite said filter bottom wall, said filter bottom wall and said sidewall cooperating to form a filter chamber for containing a beverage product.

21. The beverage cartridge of claim 19, wherein said openable portion of said cup sidewall comprises an aperture extending completely through said sidewall.

22. The beverage cartridge of claim 19, wherein said aperture comprises a slit.

23. The beverage cartridge of claim 19, wherein said openable portion of said cup sidewall comprises a weakened portion of said cup sidewall, said weakened portion comprising at least one chosen from (i) a scored line in formed said cup sidewall and (ii) a reduced-thickness region in said cup sidewall.

* * * * *